June 20, 1961   J. LE ROY FROWNFELTER   2,988,923
DUAL USE AMPLIFIER
Filed Dec. 11, 1959

INVENTOR:
Jerold L. Frownfelter
By Richard K. Ehrlich
Attorney

United States Patent Office 2,988,923
Patented June 20, 1961

2,988,923
DUAL USE AMPLIFIER
Jerold Le Roy Frownfelter, Wilmington, Calif., assignor, by mesne assignments, to Litton Systems, Inc., Beverly Hills, Calif., a corporation of Maryland
Filed Dec. 11, 1959, Ser. No. 858,973
9 Claims. (Cl. 74—5.41)

The present invention relates to an amplifier system and more particularly to an amplifier system for use in a servo loop wherein a single amplifier is operable to perform the functions of two separate amplifiers.

In recent years the use of servo mechanisms or servo loops has become quite widespread. As is well known, a servo mechanism or loop can be used to sense the angular movement of a shaft from a null position and to restore the shaft to its null position. It is this property of the servo mechanism or servo loop that has led to its widespread use in inertial guidance systems. For example, in a torque balance type accelerometer, a servo loop is used to restore the pendulum unit of the accelerometer to its null position, the magnitude of the force necessary to restore the pendulum unit being representative of the magnitude of the acceleration sensed by the instrument. In addition, in gyroscopic apparatus, a servo loop is utilized to torque the rotor element of the apparatus so that it follows the movement of the gyroscope outer case or to rotate the gyro case to slave it to the rotor element whereby the rotor element and gyro case are maintained in a null position with respect to each other.

In its most basic form, a servo loop generally comprises the following components: a pick-off or sensing device which is capable of detecting misalignment of a controlled object and communicating this misalignment with an A.C. amplitude modulated error signal; and A.C. amplifier for amplifying the modulated A.C. error signal; a demodulator for producing a D.C. signal whose magnitude and polarity are representative of the modulated error signal; a D.C. operational amplifier for amplifying the D.C. signal; a D.C. power amplifier; and a torquer responsive to the amplified D.C. signal for torquing the controlled object to eliminate the misalignment.

In most applications the size and weight of the foregoing described structure is not sufficient to cause any difficulty. However, in some applications as, for example, in inertial guidance systems, especially those used in airborne application where size and weight are critical, the size and weight of the servo mechanism components seriously limit the use of the inertial systems employing them. This is especially true when it is realized that numerous servo loops are used in each inertial system so that a substantial part of the total size and weight of the inertial system is attributable to the servo components.

One of the components of servo loops which gives particular difficulty in inertial systems, not only because of its size and weight but, in addition, because it is an inherent source of heat is the amplifier component. It is clear, of course, that because the amplifier is a heat producing component and because the operation of any of the components of the inertial guidance system is adversely affected by temperature changes, it becomes necessary to further increase the size and weight of the guidance system by adding cooling apparatus to the system. Hence, it is clear that if one of the amplifiers in each of the servo loops in the inertial system could be eliminated without adversely affecting the operation of the servo loops, the size and weight of the overall inertial system could be substantially reduced.

The present invention overcomes the foregoing described and other limitations of prior art servo loops by providing a servo loop wherein a single amplifier is operable to perform the functions of two servo loop amplifiers whereby the need for one amplifier in the servo loop is eliminated with a concomitant reduction in size and weight of the loop.

In accordance with one of the concepts of the present invention, a dual functioning servo amplifier is used to concurrently amplify the servo produced A.C. modulated error signal and demodulated D.C. signal. In accordance with another concept of the invention, the use of a dual functioning servo amplifier is made feasible by the operation of a filter circuit which is capable of separating the amplified A.C. and D.C. signals.

In accordance with a first embodiment of the present invention, a servo loop of the present invention is mechanized for use with a pendulous type torque balance accelerometer. In this embodiment of the invention, the pick-off device or detector of the servo loop is operable to sense misalignment of the accelerometer pendulum unit with respect to the outer case of the accelerometer by producing an A.C. modulated error signal representative of the misalignment. In accordance with the present invention, the A.C. error signal is passed through the dual use amplifier to the filter circuit which passes the A.C. error signal to the servo demodulator. The D.C. signal produced by the servo demodulator is also passed through the shared amplifier to the filter circuit which is operable to pass the amplified D.C. signal through the D.C. power amplifier to a servo torquer which is responsive thereto for torquing the pendulum unit to eliminate the misalignment.

In accordance with a second embodiment of the invention, a servo loop of the present invention is mechanized for detecting misalignment between a rotor element and an outer case of a gyroscope and for rotating the outer case to eliminate the misalignment.

It is, therefore, an object of the invention to provide a servo loop having a dual functioning amplifier therein.

It is another object of the invention to provide a servo loop having its size and weight substantially reduced relative to prior art servo loops.

It is a further object of the present invention to provide a servo loop utilizable with gyroscopes and accelerometers and which has one amplifier shared between the D.C. and A.C. portions of the servo loop.

It is a further object of the present invention to provide a filter circuit operable to separate the D.C. and A.C. amplified signals concurrently produced by the dual functioning amplifier.

The novel features which are believed to be characteristic of the invention, both as to its organization and method of operation, together with further objects and advantages thereof, will be better understood from the following description considered in connection with the accompanying drawing in which two embodiments of the invention are illustrated by way of example. It is to be expressly understood, however, that the drawing is for the purpose of illustration and description only, and is not intended as a definition of the limits of the invention.

Figure 1:
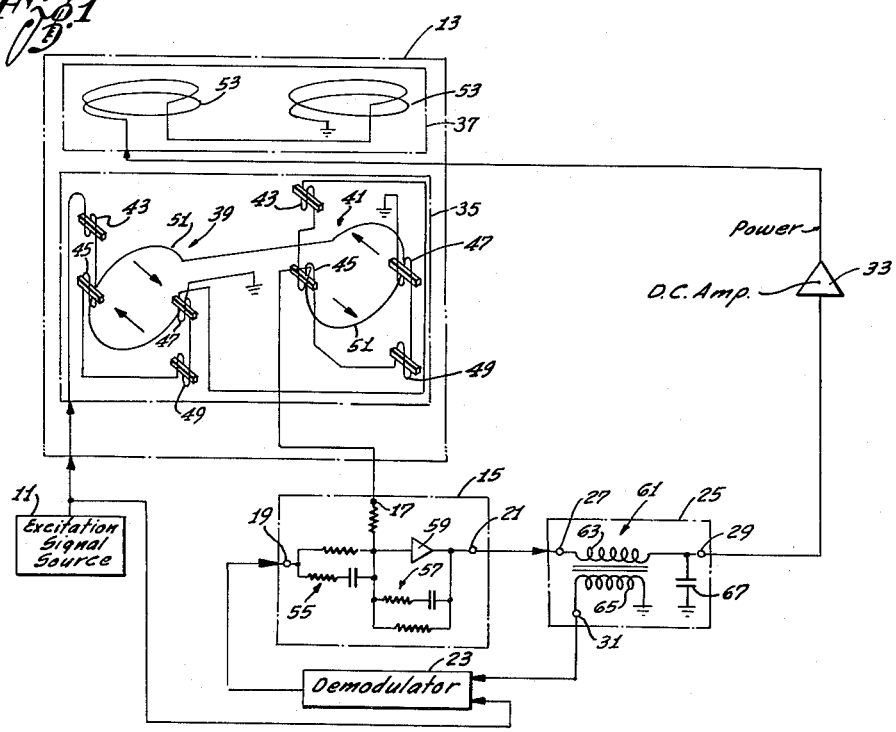
FIGURE 1 is a schematic view of an amplifier servo loop of the present invention mechanized for use with a pendulous type torque balance accelerometer.

Referring now to the drawings, wherein like or corresponding parts are designated by the same reference characters throughout the several views, there is shown in FIGURE 1 an illustrative view of an accelerometer pendulum restoring servo loop of the invention including therein a dual functioning amplifier for concurrently amplifying two servo signals. Hence, the single dual functioning amplifier is equivalent in operation to two separate amplifiers thereby allowing the servo loop of the invention to be mechanized with one less amplifier than is required in prior art servo loops.

As shown in FIGURE 1, the accelerometer servo loop includes the following major components: an excitation signal source 11 for generating an excitation signal; an accelerometer 13 operable in response to the excitation signal for producing an A.C. "error" signal, the "error" signal being amplitude modulated in accordance with the magnitude and polarity of the accelerations sensed by accelerometer 13; an amplifier assembly 15 having a pair of input terminals 17 and 19 and an output terminal 21, the assembly being responsive to the application of the "error" signal at terminal 17 for producing an amplified output signal at output terminal 21 equal to the sum value of the "error" signal applied at input terminal 17 and the value of the signal applied at input terminal 19; a demodulator 23 responsive to the excitation signal from excitation signal source 11 for operating on the "error" signal applied thereto to produce a D.C. signal whose magnitude and polarity are representative of the amplitude modulation of the "error" signal; a filter 25 having an input terminal 27 connected to output terminal 21 of amplifier 15 and an output terminal 31 connected to demodulator 23 and an output terminal 29, filter circuit 25 being operable for passing the A.C. "error" signal component produced by amplifier 15 to demodulator 23 and for passing the D.C. signal component of the amplifier output to terminal 29; and a D.C. power amplifier 33 having its input terminal connected to output terminal 29 of filter 25 and its output terminal connected to accelerometer 13 whereby the amplified D.C. signal is amplified and applied to accelerometer 13 to close the servo loop.

Referring now with particularity to accelerometer 13, as is well known the torque balance type accelerometer includes a pendulum unit which is responsive to accelerations applied along a sensitive axis for rotating from its null position about its pivot axis. Further, the accelerometer includes a pick-off or detector 35 for detecting the pendulum unit rotation and for producing the A.C. "error" signal which is indicative of the magnitude and direction of the rotation. In addition, the accelerometer includes a torquer unit 37 responsive to the D.C. signal for torquing the pendulum to restore it to its null position.

Referring to FIGURE 1, accelerometer 13 is depicted therein with a schematic wiring diagram shown in isometric form, illustrating the relative position and nature of the pick-off and torquer units. As shown in FIGURE 1, pick-off unit 35 includes a pair of "error" signal generators 39 and 41. Further, each signal generator includes an exciter coil assembly having four coils 43, 45, 47 and 49 therein, the exciter coil assemblies being coupled to opposite ends of the accelerometer case with the pendulum unit fitted therebetween. Further, each of the "error" signal generators includes a pick-off coil 51 coupled to the pendulum unit so that it is in equal registry with its corresponding exciter coils when the pendulum unit is in the null position, the generators being responsive to the positioning of the pick-off coils in other than the position of equal registry for generating an error voltage across pick-off coils 51 which is amplitude modulated in accordance with the position of the coils.

As is shown in FIGURE 1, the D.C. signal from amplifier 33 is applied to a pair of coils 53 positioned on the pendulum unit in such a manner that they circumscribe a pair of cylindrical torquing magnets, respectively, not shown, connected to the accelerometer outer case. As is indicated in FIGURE 1, the two coils are wound oppositely so that when the D.C. signal is passed therethrough, one of the coils is repelled from the torquer magnet in registry therewith and the other coil is attracted to the torquer magnet in registry therewith. When it is noted that the pendulum unit pivot axis is positioned midway between the two coils 53 it is clear that a pure rotational torque is imparted to the pendulum unit having a magnitude and polarity dependent upon the magnitude and polarity of the D.C. signal.

Hence, the accelerometer pendulum unit is operable in response to accelerations applied thereto along its sensitive axis to rotate from its null position. Generators 39 and 41 sense this rotation and produce a modulated A.C. "error" signal which is representative of this movement, this A.C. signal being converted to the D.C. signal as described generally hereinbefore. The D.C. signal is then applied to coils 53 in such a manner that the pendulum unit is torqued to restore it to its null position, the magnitude and polarity of the D.C. signal being representative of the magnitude and polarity of the sensed acceleration.

In connection with the accelerometer, it should be noted that as described herein primary emphasis has been attached to the electrical operation and structure of the accelerometer while little emphasis has been given to the actual physical structure. With regard to a detailed discussion of the actual mechanical construction of the accelerometer, as well as a detailed description of the operation of the accelerometer, reference is made to copending U.S. patent application Serial No. 814,487, by Bruce A. Sawyer, entitled, "Miniaturized Temperature Insensitive Accelerometer," filed May 20, 1959. Further, as has been hereinbefore explained, accelerometer 13 is electrically energized by the excitation signal from excitation signal source 11. More particularly, as shown in FIGURE 1, the excitation signal is applied to the exciter coils of generators 39 and 41 and energizes the generators to produce the "error" signal.

Referring to the excitation signal source one skilled in the art will be aware of any number of types of signal generators suitable for use as excitation signal source 11. For example, the use of a conventional 5 kc. signal generator has proved to be quite satisfactory.

Continuing with the discussion of the invention, attention is directed to amplifier assembly 15. As shown in FIGURE 1, amplifier assembly 15 includes: a lead network, generally designated 55, and a lag network, generally designated 57; input terminals 19 and 17 and output terminal 21; and a conventional D.C. amplifier 59. As indicated in FIGURE 1, the A.C. "error" signal from accelerometer 13 is applied via terminal 17 directly to amplifier 59 and hence to output terminal 21. On the other hand, the D.C. signal from demodulator 23 is applied to amplifier 59 via terminal 19 and lead network 55.

As has been hereinbefore indicated, many conventional prior art D.C. amplifiers are suitable for use as amplifier 59. However, it is preferable that an amplifier be used which has a linear or flat response to the frequency range of the excitation signal. For example, in utilizing a 5 kc. excitation signal, the response of amplifier 59 should be reasonably flat, up to and including the 5 kc. range.

Examining the operation of amplifier 59, it is clear that both the A.C. "error" signal and the D.C. signal are applied continuously and concurrently to amplifier 59 whereby there is presented at output terminal 21 the sum of both the signals.

Continuing with the discussion of the invention, attention is directed to filter 25 whose input terminal 27 is directly connected to output terminal 21 of amplifier 15. As has been heretofore explained, filter 25 is operable to separate the A.C. "error" signal and the D.C. signal and to pass the D.C. signal to its output terminal 29 and the A.C. "error" signal to its output terminal 31. As is shown in FIGURE 1, filter 25 includes a transformer 61 having a primary winding 63 and a secondary winding 65 and a capacitor 67. As is further indicated in FIGURE 1, one end of primary winding 63 is connected to input terminal 27 while the other end of the primary winding is connected to output terminal 29 and one side of capacitor 67, the other side of the capacitor being connected to a source of ground potential. Further, one end of secondary winding 65 of transformer 61 is connected to output terminal 31 while the other end of the winding is also connected to the source of ground potential.

Referring now to the operation of filter 25 to separate the D.C. and the A.C. signals from one another, the high frequency A.C. signals applied to terminal 27 flow through primary winding 63 and capacitor 67 to ground since the capacitor presents a very low impedance to the high frequency A.C. signals. Further, since capacitor 67 does present a low impedance, a substantial A.C. current flows through primary winding 63 and the capacitor whereby a substantial voltage is induced across secondary winding 65. Hence, the A.C. signal is applied to terminal 31. It is clear that little or no part of the A.C. signal flows through terminal 29 since amplifier 33 which is connected to terminal 29 presents a high relative impedance with respect to the impedance of capacitor 67.

Examining the operation of filter 25 with respect to the D.C. signal it is clear that capacitor 67 presents a very high impedance to the D.C. signal so that the D.C. signal flows through primary winding 63 and through terminal 29 to amplifier 33. However, while the impedance of amplifier 33 is substantially less than the impedance of capacitor 67, the impedance of amplifier 33 is still substantial enough to limit the current flow through primary winding 63 to such an extent that little or no voltage is induced across secondary winding 65 as a result of the D.C. signal. Hence it is clear that filter 25 operates to separate the D.C. signal from the A.C. signal and to apply the A.C. signal to demodulator 23 via terminal 31 and the D.C. signal to amplifier 33 via terminal 29.

As indicated in FIGURE 1, demodulator 23 is energized by the excitation signal from excitation signal source 11 to respond to the application of the amplitude modulated A.C. "error" signal received from terminal 31 of filter 25 for producing the D.C. output signal which has an average value proportional to the modulation of the A.C. signal. Many demodulator circuits suitable for use as demodulator 23 are well known in the prior art. For example, a full-wave phase-sensitive detector suitable for use as demodulator 23 is described by William R. Ahrendt in, "Servomechanism Practice," at page 75, published by McGraw-Hill Book Company, Inc. in 1954. While the circuit described in the foregoing reference is mechanized with conventional diode tubes, it is clear that the circuit can be easily modified to use semiconductor diodes in place of the tube diodes whereby the size and weight of the demodulator can be substantially reduced.

As has been heretofore explained, the D.C. signal produced by demodulator 23 is passed through amplifier assembly 15 and operational amplifier 59 along with the continuously generated A.C. signal from the accelerometer filter 25. The filter separates the D.C. signal from the A.C. signal and passes it to D.C. power amplifier 33. Amplifier 33 increases the current magnitude of the D.C. signal and the current amplified D.C. signal is, as hereinbefore discussed, applied to the torquing coils of the accelerometer. Reviewing the operation of the first embodiment of the invention, it is apparent that the accelerometer servo loop is mechanized with amplifier assembly 15 performing the functions of two separate amplifiers of prior art servo loops, namely; the servo A.C. amplifier and the D.C. operational amplifier. It should be noted that the principle of dual concurrent use of a servo amplifier is not limited to an accelerometer servo loop but can be utilized in numerous other varieties of servo loops. For example, referring again to specific servo loops used in inertial guidance systems, gyroscopic servo loops can be mechanized utilizing the foregoing principle.

Figure 2:
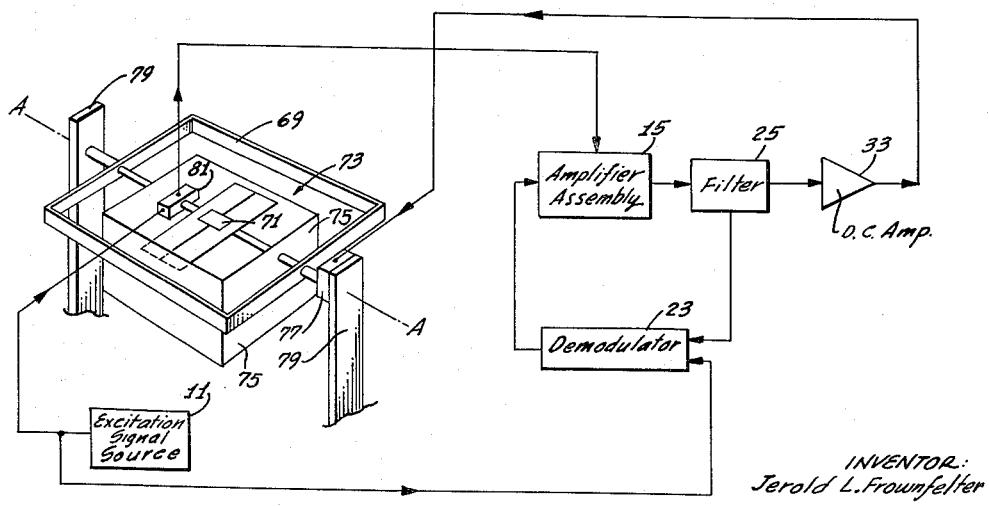
FIGURE 2 is an illustrative view of an amplifier gimbal servo loop operable for slaving the position of a gimbal ring to the rotor element of a gyroscope.

Continuing with the discussion of the invention, there is shown in FIGURE 2 a gimbal servo loop for use with a single-degree-of-freedom gyroscope wherein the angular position of a gimbal 69 rotatable about its gimbal axis, designated in FIGURE 2 by line A—A, is slaved to the angular position of a rotor element 71 of a single-degree-of-freedom gyroscope 73. While a one gimbal system is depicted in FIGURE 2 for simplicity of description, as is well known to those skilled in the art, in stabilizing an inertial system platform three single-degree-of-freedom gyroscopes are generally utilized, the rotor elements of the three gyroscopes defining a plane in inertial space to which the platform is slaved.

As indicated in FIGURE 2, gyroscope 73 produces an A.C. amplitude-modulated "error" signal which is representative of the angular displacement of gyroscope outer housing 75 from its null position with rotor 71. As is further shown in FIGURE 2, outer housing 75 is supported from a mounting structure 79 by gimbal ring 69 and is rotatable with the gimbal ring. In addition, the "error" signal amplifier assembly 15, filter 25, demodulator 23, excitation signal source 11, and D.C. amplifier 33 are intercoupled in the same manner described in connection with the first embodiment of the invention whereby the amplified D.C. is produced at the output of amplifier 33. The D.C. signal having its value determined by the original modulation of the "error" signal.

The D.C. signal is applied to a torquer 77 mounted on gyroscope mounting structure 79, the torquer being operative for rotating gimbal ring 69 and hence outer housing 75 so that the outer housing can be nulled in position with respect to rotor element 71. Hence, the gimbal ring is slaved in position to rotor element 71 and since the rotor element is fixed in intertial space due to gyroscopic action, the gimbal ring is also fixed in inertial space regardless of rotation of the mounting structure 79 about the gimbal axis.

Referring now to the structure of gyroscope 73 specifically, it is clear that rotor element 71 is mounted to the gyro case in such a manner that it is free to rotate about a single-degree-of-freedom axis which is orthogonal to the rotor spin axis and coincident with gimbal axis A—A. As is shown in FIGURE 2, a pick-off unit 81 is mounted on outer housing 75, the pick-off unit being operable in response to the application of the excitation signal from excitation signal source 11 for sensing the displacement of the outer housing 75 from its null position with respect to rotor element 71 and to produce the modulated "error" signal representative of this displacement.

Continuing with the discussion of the invention, it is clear that in the second embodiment of the invention a gimbal servo loop has been mechanized which includes a single amplifier which is capable of performing the function of two amplifiers in prior art loops so that the size and weight of the servo loop of the invention is substantially reduced over that of the prior art devices. Since, as has been heretofore explained, three such servo loops as are shown in FIGURE 2 are generally needed to stabilize an inertial platform in space, it is clear that a substantial reduction in size and weight can be accomplished when the stable platform is mechanized with the servo loops of the present invention. An even greater reduction in size and weight can be obtained if the accelerometers which are generally mounted on the stabilized platform of an inertial system are mechanized with servo loops in accordance with the invention.

It will be understood, of course, that the servo loop of the invention may be modified or altered in many particulars without departing from the invention. For example, it should be noted that while the operational and power amplifiers are depicted separately herein it is clear that the two amplifiers can be easily mechanized in a common assembly thereby further reducing the size and weight of

What is claimed as new is:

1. An amplifier unit responsive to a modulated A.C. signal for generating a D.C. signal whose magnitude is related to the modulation of the A.C. signal, said circuit comprising: an amplifier responsive to the modulated A.C. signal for producing an amplified modulated A.C. signal and concurrently responsive to the D.C. signal for producing an amplified D.C. signal; demodulator means responsive to the application of said amplified modulated A.C. signal thereto for producing the D.C. signal; first coupling means interconnecting said demodulator means and said amplifier for applying the D.C. signal to said amplifier; filter means having an input terminal and first and second output terminals, said filter means being responsive to said amplified modulated A.C. signal and said amplified D.C. signal for passing said amplified A.C. signal to said first output terminal and said amplified D.C. signal to said second output terminal; and a second coupling means interconnecting said first output terminal and said demodulator means for applying said amplified A.C. signal to said demodulator means.

2. The combination defined in claim 1 wherein said filter means includes a capacitor having first and second terminals and a transformer.

3. The combination defined in claim 2 which further includes a source of ground potential and wherein said transformer includes a primary and a secondary winding, one end of said primary winding being connected to said input terminal of said filter means and the other end of said primary winding being connected to said second output terminal and one terminal of said capacitor, the other terminal of said capacitor being connected to said source of ground potential, one end of said secondary winding being connected to said first output terminal and the other end of said secondary winding being connected to said source of ground potential.

4. In a circuit responsive to a modulated A.C. signal for generating a D.C. signal whose magnitude is related to the modulation of the A.C. signal, the combination comprising: an amplifier responsive to the modulated A.C. signal and the D.C. signal for producing concurrently an amplified modulated A.C. signal and an amplified D.C. signal at a common output terminal; a filter circuit having an input terminal and first and second output terminals, said filter circuit being responsive to the application of said amplified modulated A.C. signal and said amplified D.C. signal at its input terminal for passing said amplified modulated A.C. signal to said first output terminal and said amplified D.C. signal to said second output terminal; and connecting means for electrically connecting said common output terminal of said amplifier to said input terminal of said filter circuit.

5. A servo loop operable for detecting misalignment from a null position of an object and for imparting movement to the object to eliminate the misalignment, said loop comprising: pick-off means positioned adjacent the object and operable for producing a modulated A.C. signal, the modulation being representative of the misalignment; a first amplifier having an input terminal, an output terminal and first means, connected to said input terminal for applying said modulated A.C. signal and a predeterminad D.C. signal to said input terminal, said amplifier being responsive thereto for producing concurrently an amplified modulated A.C. signal and an amplified predetermined D.C. signal at said output terminal; a filter circuit having an input terminal and first and second output terminals, said filter circuit being responsive to the application of said amplified A.C. signal and the predetermined amplified D.C. signal to its input terminal for passing said amplified A.C. signal to said first output terminal and the amplified predetermined D.C. signal to said second output terminal; a demodulator connected to said first output terminal for receiving said amplified modulated A.C. signal to produce the predetermined D.C. signal having a magnitude and a polarity representative of said modulated A.C. signal; coupling means for electrically connecting said demodulator to said first means for applying the predetermined D.C. signal to said input terminal of said amplifier; second means responsive to the amplified predetermined D.C. signal for imparting motion to the object, the magnitude and direction of the motion being related to the magnitude and polarity of the predetermined D.C. signal; and third means for coupling said second output terminal of said filter circuit to said second means.

6. The combination defined in claim 5 wherein said third means includes a D.C. amplifier for further amplifying the amplified predetermined D.C. signal.

7. The combination defined in claim 6 wherein said filter circuit includes a transformer intercoupling said input terminal to said first output terminal and a capacitor for isolating said second output terminal from said A.C. signal applied to said input terminal.

8. A servo loop for use with a torque balance pendulous accelerometer and operable for detecting deviation from a null position of the accelerometer pendulum and for torquing the pendulum to eliminate the deviation, said loop comprising: pick-off means positioned adjacent the pendulum and operable for producing a modulated A.C. signal, the modulation being representative of the deviation of the pendulum from the null position; a first amplifier having an input terminal, an output terminal, and first means connected to said input terminal for applying said modulated A.C. signal and a predetermined D.C. signal to said input terminal, said amplifier being responsive thereto for producing an amplified modulated A.C. signal and an amplified D.C. signal at said output terminal; a filter circuit having an input terminal and first and second output terminals said filter circuit being responsive to the application of said amplified A.C. signal and the predetermined amplified D.C. signal at its input terminal for passing said amplified A.C. signal to said first output terminal and the amplified predetermined D.C. signal to said second output terminal; a demodulator connected to said first output terminal for receiving said amplified modulated A.C. signal to produce the predetermined D.C. signal having a magnitude and a polarity representative of said modulated A.C. signal; coupling means for electrically connecting said demodulator to said first means for applying the predetermined D.C. signal to said input terminal of said amplifier; second means responsive to the amplified predetermined D.C. signal for torquing the pendulum in accordance with the magnitude and polarity of the predetermined D.C. signal whereby the pendulum is kept nulled; and third means for coupling said second output terminal of said filter circuit to said second means.

9. A servo loop for use with a gyroscope and operable for detecting deviation from a null position of the gyro rotor with respect to the gyro case and for torquing the rotor to eliminate the deviation, said loop comprising: pick-off means positioned adjacent the rotor and operable for producing a modulated A.C. signal, the modulation being representative of the deviation of the rotor from the null position; a first amplifier having an input terminal, an output terminal and first means connected to said input terminal for applying, said modulated A.C. signal and a predetermined D.C. signal to said input terminal for producing an amplified modulated A.C. signal and an amplified D.C. signal at said output terminal; a filter circuit having an input terminal and first and second output terminals, said filter circuit being responsive to the application of said amplified A.C. signal and the predetermined amplified D.C. signal at its input terminal for passing said amplified A.C. signal to said first output terminal and the amplified predetermined D.C. signal to said second output terminal; a demodulator connected to said first output terminal for receiving said amplified modulated A.C. signal to produce the predetermined D.C. signal having a magnitude and a polarity representative of said modulated A.C. signal; coupling means for electrically connecting said demodulator to said first means for applying the predetermined D.C. signal to said input terminal of said amplifier; second means responsive to the amplified predetermined D.C. signal for torquing the gyro case in accordance with the magnitude and polarity of the predetermined D.C. signal whereby the gyro case is kept in the null position with respect to the rotor; and third means for coupling said second output terminal of said filter circuit to said second means.

References Cited in the file of this patent

UNITED STATES PATENTS

| | | |
|---|---|---|
| 2,704,456 | Hammond | Mar. 22, 1955 |
| 2,752,790 | Draper | July 3, 1956 |
| 2,787,909 | Ruckstahl et al. | Apr. 9, 1957 |